(12) United States Patent
Covell et al.

(10) Patent No.: US 9,955,205 B2
(45) Date of Patent: Apr. 24, 2018

(54) METHOD AND SYSTEM FOR IMPROVING INTERACTIVE MEDIA RESPONSE SYSTEMS USING VISUAL CUES

(75) Inventors: Michele Covell, Palo Alto, CA (US);
Sumit Roy, Menlo Park, CA (US);
John Ankcorn, Palo Alto, CA (US);
Frederic Huve, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 3328 days.

(21) Appl. No.: 11/149,719

(22) Filed: Jun. 10, 2005

(65) Prior Publication Data

US 2006/0282774 A1 Dec. 14, 2006

(51) Int. Cl.
*H04N 21/414* (2011.01)
*H04N 7/173* (2011.01)
*H04N 21/2343* (2011.01)
*H04N 21/472* (2011.01)
*H04N 21/478* (2011.01)
*H04N 21/61* (2011.01)
*H04N 21/81* (2011.01)

(52) U.S. Cl.
CPC ... *H04N 21/41407* (2013.01); *H04N 7/17318* (2013.01); *H04N 21/2343* (2013.01); *H04N 21/472* (2013.01); *H04N 21/478* (2013.01); *H04N 21/6131* (2013.01); *H04N 21/8126* (2013.01)

(58) Field of Classification Search
CPC ............... H04N 19/86; H04N 21/2343; H04N 21/41407; H04N 21/472; H04N 21/478; H04N 21/6131; H04N 21/8126; H04N 7/17318

USPC .............. 707/104.1, 204, E17.009; 709/231; 375/E7.025, E7.073, E7.267, E7.278; 714/5, E11.106, E11.128, 8; 711/112, 711/206, 3
See application file for complete search history.

(56) References Cited

U.S. PATENT DOCUMENTS

| | | | | |
|---|---|---|---|---|
| 5,870,085 A | * | 2/1999 | Laksono | 345/551 |
| 6,848,011 B2 | * | 1/2005 | Park et al. | 710/14 |
| 6,859,451 B1 | * | 2/2005 | Pasternack et al. | 370/352 |
| 7,089,313 B2 | * | 8/2006 | Lee et al. | 709/227 |
| 7,237,254 B1 | * | 6/2007 | Omoigui | 725/94 |

(Continued)

FOREIGN PATENT DOCUMENTS

| | | |
|---|---|---|
| EP | 1071024 | 1/2001 |
| JP | P2000-222398 A | 8/2000 |

(Continued)

OTHER PUBLICATIONS

Mueller W. et. al.: "Interactive Multimodal User Interfaces for Mobile Devices", Proceedings of the 37th Hawaii International Conference on System Sciences, Jan. 5-8, 2004, Piscataway, NJ, USA, IEEE. Jan. 5, 2004, pp. 286-295.*

(Continued)

*Primary Examiner* — Khaled Kassim
(74) *Attorney, Agent, or Firm* — HP Inc Patent Department

(57) ABSTRACT

Embodiments of the present invention recite a method and system for providing visual cues in an interactive media response system. In one embodiment, at least one visual prompt for display on a thin device is generated. The visual prompt is then sent to the thin device where it is displayed.

33 Claims, 10 Drawing Sheets

(56) References Cited

U.S. PATENT DOCUMENTS

| | | | |
|---|---|---|---|
| 8,107,525 B1* | 1/2012 | Chan | H04N 7/15 375/240.01 |
| 2003/0009281 A1* | 1/2003 | Whitham | 701/211 |
| 2003/0044080 A1* | 3/2003 | Frishman | G06T 5/20 382/268 |
| 2003/0130822 A1* | 7/2003 | Steele | 702/188 |
| 2003/0152146 A1* | 8/2003 | Lin | H04N 19/136 375/240.16 |
| 2003/0185296 A1* | 10/2003 | Masten, Jr. | 375/240.01 |
| 2004/0064576 A1* | 4/2004 | Goldhor et al. | 709/232 |
| 2005/0160470 A1* | 7/2005 | Strauss | 725/115 |
| 2005/0165915 A1* | 7/2005 | Hejna, Jr. | 709/219 |
| 2005/0254692 A1* | 11/2005 | Caldwell | G06T 9/007 382/120 |
| 2005/0254783 A1* | 11/2005 | Chen | 386/68 |
| 2006/0222322 A1* | 10/2006 | Levitan | 386/68 |
| 2007/0168188 A1* | 7/2007 | Choi | 704/211 |

FOREIGN PATENT DOCUMENTS

| | | | | |
|---|---|---|---|---|
| JP | P2001-125862 A | 5/2001 | | |
| JP | P2003-99302 | 4/2003 | | |
| JP | P2004-128823 A | 4/2004 | | |
| JP | P2005-12295 A | 1/2005 | | |
| JP | P2005-141360 A | 6/2005 | | |
| WO | WO 9612270 A1 * | 4/1996 | | G10L 3/02 |
| WO | WO99/31856 | 6/1999 | | |
| WO | WO 99/55049 | 10/1999 | | |

OTHER PUBLICATIONS

Mueller et al. "Interactive Mutimodal User Interfaces for Mobile Devices". Proceedings of the 37th Hawaii International Conference on System Sciences. 2004.*

Tsai Min-Jen—"The VoiceXML Dialog System for the E-Commerce Ordering Service"—Proc of the 9th Int'l Conf on Computer Supported Cooperative Work in Design—May 24, 2005—v 1.

Feng Liu et al—An Approach of Integrating sip in Converged Multimodal/Multimedia Communication Services—Proc of ICCCN 2003—pp. 137-142.

Mueller W et al—"Interactive Multimodal User Interfaces for Mobile Devices"—Proc of 37th Hawaii Int'l Conf on System Sciences—Jan. 5, 2004—pp. 286-295.

Butler, et al.: Device Independence and The Web; HP Labs/Bristol; Spotlight Sep./Oct. 2002.

* cited by examiner

METHOD AND SYSTEM FOR IMPROVING INTERACTIVE MEDIA RESPONSE SYSTEMS USING VISUAL CUES

TECHNICAL FIELD

Embodiments of the present invention are related to the field of the interactive media systems.

BACKGROUND

Streaming media (e.g., video and/or audio) to mobile devices such as cellular telephones, personal digital assistants (PDAs), etc., is an important emerging market. For example, in order to lessen a user's perceived duration of being "on-hold," a customized movie trailer or other interesting video content may be streamed to the mobile device. Also, being able to select and watch professionally produced material such as sports, or movies while away from a home or office environment greatly expands the market for video on demand (VoD). Additionally, adding a video back channel (e.g., expressions, gestures, postures, etc.) lessens the perceived gap between remote and local interactions.

As seen with the revenue generated by the ring-back tones and the push-to-talk markets, new telco-services markets can be quite large and can occur in unexpected areas, the promise of fresh markets is one of the driving forces behind the use of third generation (3G) wireless standards in Asia and the move to these standards in Europe. Even in the United States, where 2.5G/3G adoption lags other parts of the world, there have already been some streaming video products for consumer handsets (e.g., cellular telephones).

Unfortunately, the promise of these markets is largely unrealized to date, due to two major barriers. One barrier is the fact that many of the mobile devices which access streaming media have limited capabilities (e.g., limited processing and/or memory capacities) and offer restricted interfaces to the end-user. Thus, these mobile devices lack the resources to effectively operate complex media presentation applications which can be utilized, for example, on a user's home computer, or to store large amounts of data. The restricted interfaces typically found in these devices limits how the user navigates and selects a plurality of options (e.g., voice mail options, or a list of movies which may be accessed). As a result, the user typically must wait until the options, which are presented serially over an audio interface, are presented. Another drawback to these interfaces is that the user may be required to enter a complex keying sequence to indicate a selected action.

Another barrier to these markets is the wireless communication infrastructure (e.g., cellular telephone networks) used to deliver streaming media to the mobile devices. For example, delivering the streaming media is constrained by the telecommunications network interface and codec standards (e.g., the Internet Protocol Multimedia Subsystem (IMS)) that must be maintained within the telecommunications network. This particularly shapes how interactive control of the streaming media can be implemented.

While the telecommunications providers want to provide a responsive interface with rich functionality to the user, they do not necessarily want to implement special client software on the mobile devices which may not be compliant with existing network standards. For example, telecommunications providers are extremely sensitive to the types of data allowed onto their networks, particularly since viruses attacking cellular devices and/or networks are becoming more common. Additionally, when moving data from an Internet Protocol (IP) network to the telecommunications network even more constraints are introduced. As a result, the telecommunications providers typically will not allow data packets to enter their networks that are not compliant with their standards. One result of this is that user's of mobile devices are limited in the choices of media players which can operate on their devices. Another result is that existing interfaces do not provide user's with the level of responsiveness and/or ease of use that they have come to expect with streaming media presented over their home computer systems.

DISCLOSURE OF THE INVENTION

Embodiments of the present invention recite a method and system for providing visual cues in an interactive media response system. In one embodiment, at least one visual prompt for display on a thin device is generated. The visual prompt is then sent to the thin device where it is displayed.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

MODES FOR CARRYING OUT THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating," "sending," "displaying," "presenting," "receiving," "delaying," "suspending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
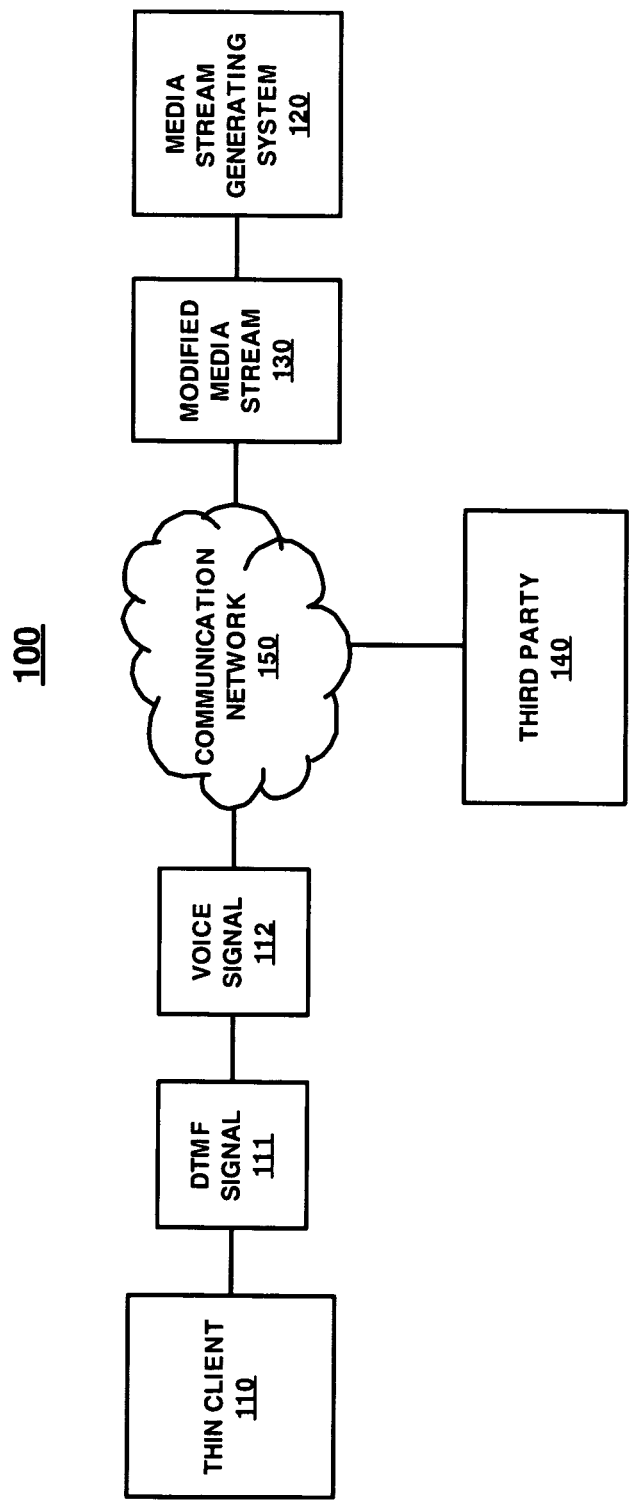
FIG. 1 is a diagram of an interactive media response system utilized in accordance with embodiments of the present invention.

FIG. 1 is a diagram of an interactive media response system 100 utilized in accordance with embodiments of the present invention. In the embodiment of FIG. 1 a thin device 110 is communicatively coupled with a media stream generating system 120 via communication network 150. For the purposes of the present application, the term "thin device" refers to an electrical device upon which it is desired to utilize the existing control stack without modifying its existing software. In other words it is desired to add new functionality to existing legacy devices without modifying the software already operating upon them. As an example, it is desired to use a cellular telephone handset in its "telephony mode." Since the control stack in telephony mode does not typically include mid-session control messages for controlling video presentation, the client software is unaware that the playback changes are requested (e.g., using voice or DTMF commands). In this example, media stream generating system 120 treats the data that has already been sent to thin device 110 as "immutable," that is, that it will be played back by thin device 110 in the form in which it was sent without local modification being performed by thin device 110. In embodiments of the present invention, thin device 110 is operable for encoding/decoding adaptive multi-rate (AMR) audio streams and video streams compliant with the H.263 specification. Additionally, in embodiments of the present invention, thin device 110 is operable for decoding video media streams compliant with the Moving Pictures Experts Group Audio Layer 4 (MPEG4) specification. While the present embodiment recites the use of a thin device, it is noted that embodiments of the present invention are not limited to them alone. In other words, embodiments of the present invention are well suited to be implemented upon, for example, a home computer system, or the like.

In embodiments of the present invention, communication network 150 comprises, but is not limited to, a wireless communication network such as a cellular telephone network, a radio network, a Wi-Fi network (e.g., compliant with IEEE 802.11a or 802.11b standards), a Bluetooth wireless communication network, a radio network, an infrared (IR) communication network, a satellite link, or the like. However, embodiments of the present invention are well suited to be implemented on other networks such as an Ethernet network, a broadband connection, the Internet, or the like. In embodiments of the present invention, the communication between thin device 110 and media stream generating system 120 comprises both an audio channel and a video channel.

In embodiments of the present invention, media stream generating system 120 comprises one or more computers for providing streaming media content to thin device 110 (e.g., a cellular telephone, a personal digital assistant (PDA), or the like). In embodiments of the present invention, a media stream generated by media stream generating system 120 may comprise video media, audio media, audio/video media, or other multiple media streams (e.g., multiple audio media streams) which are sent to thin device 110. Additionally, media stream generating system 120 is further for modifying one or more of these media streams in response to a request generated by thin device 110. As described above, because it is desired to retain an un-modified control stack in thin device 110, media stream generating system 120 may modify one or more of the media streams before sending it to thin device 110.

In another embodiment of the present invention, the modification to the media stream may be in response to a request from a third party (e.g., neither thin device 110, or media stream generating system 120). Referring again to FIG. 1, a third party 140 generates a request to media stream generating system 120 to modify the media stream that is sent to thin device 110. As an example, a technical support person can generate a request to media stream generating system 120 that a demonstration video that is being streamed to a user of thin device 110. In response to the request, media stream generating system 120 generates a modified media stream 130 which is then sent to thin device 110.

Embodiments of the present invention may be implemented upon a cellular telephone, or other electronic device which accesses a cellular telephone network. Therefore it is desirable that signaling methods compatible with a telecommunication network are implemented in embodiments of the present invention. Current telecommunication networks are optimized for low-latency, low-bandwidth voice delivery on the data path, but high latencies in the control path. For example, the IMS control plane for call setup/teardown can take more than a second end-to-end. In contrast, menu selection and playback control (e.g., barge-in to stop streaming or otherwise modify the media stream) require low-latency response times, in order to provide acceptable levels of responsiveness to the user.

The combination of long latencies in the telecommunication network's control path and responsiveness requirements for mid-call control combine to make the use of in-band signaling (e.g., where control signals are sent via the telecommunication data path) a desirable method for conveying user inputs. The use of low-latency controls is desired because if there is too long of a pause between a user command and its implementation, the user may think that the controller is broken, or that their input was not detected by thin device 110. As a result, the user may continue inputting their selection which may cause media stream generating system 120 to perform an action that the user did not intend. Alternatively, the use of out-of-band signaling may cause longer latency in responsiveness to the user's commands, thus lessening the user's perception that they are using an interactive control system.

In-band signaling for mid-call control can be done by downloading custom client software onto the thin device 110. A drawback of this method is that the software may generate its own specialized set of communication signals which may not be compatible with existing telecommunications network interface and codec standards. In embodiments of the present invention, current generic in-band encodings from the thin device 110 such as Dual Tone Multi-Frequency (DTMF) signals (e.g., 111), or voice commands (e.g., 112) are used to convey requests from thin device 110 to media stream generating system 120. Again, it is noted that embodiments of the present invention are not limited to these signals alone and may utilize software downloaded into thin device 110 if the software is compliant with existing network interface and protocol constraints.

Figure 2:
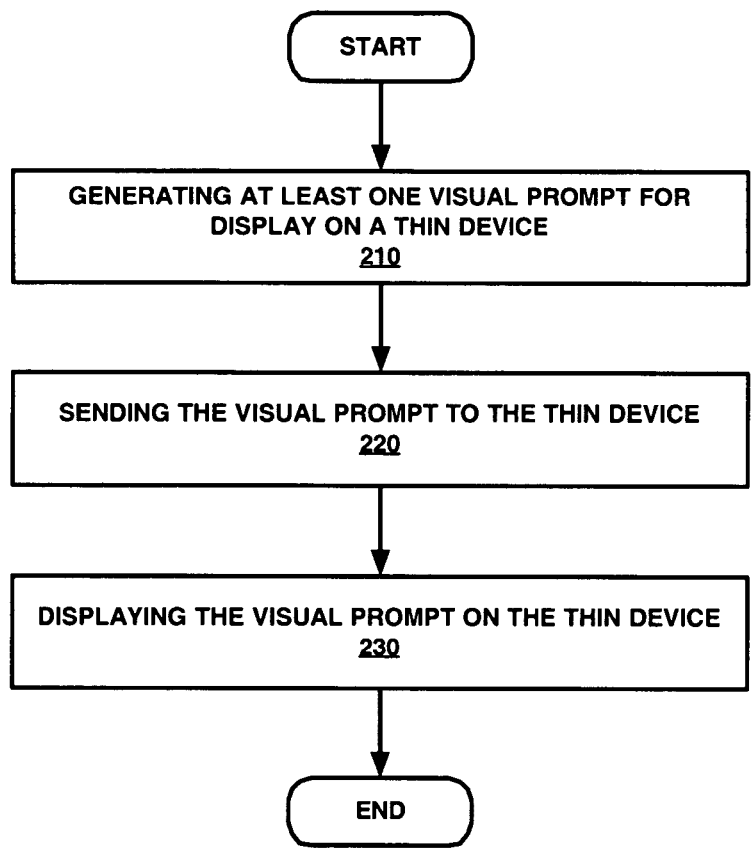
FIG. 2 is a flowchart of a method for improving interactive media response systems using visual cues in accordance with embodiments of the present invention.

FIG. 2 is a flowchart of a method 200 for improving interactive media response systems using visual cues in accordance with embodiments of the present invention. In step 210 of FIG. 2, at least one visual prompt for display on a thin device is generated. In embodiments of the present invention, modification of the media stream is performed by a software application resident in media stream generating system 120. In embodiments of the present invention, media stream generating system 120 can be used to implement an interactive media response system which uses visual cues to present user options. This is advantageous over current interactive voice applications (e.g., voice mail access, or airline reservation systems) because the video channel can be used to present multiple choices, or "visual prompts," to the user of thin device 110 at the same time. In embodiments of the present invention, nested selections sets can be presented to a user using text or icon based menus that can be used to quickly navigate the application. Conventional interactive voice applications are limited to presenting options to a user serially as it is difficult for a user to listen to multiple audio sources at the same time. As a result, a user may be forced to wait until a desired option is presented via the audio interface, remember a complex keying sequence to access a desired result, or to remember a large set of options before deciding which option they wish to select.

In embodiments of the present invention, the information presented over the video channel may be presented concurrently with audio information. In embodiments of the present invention, the visual prompts may comprise information which corresponds to the information presented over the audio channel, which is correlated to the information presented over the audio channel, or which is un-related to the information presented over the audio channel. In embodiments of the present invention, dynamic generation of the visual prompts is facilitated by accessing the markup information generated by a VoiceXML application. For example, embodiments of the present invention may generate VoiceXML text strings which are used when presenting audio prompts via thin device 110. In embodiments of the present invention, VoiceXML text strings are used by text-to-video component 126 to generate visually appropriate a visual representation (e.g., a visual prompt, or cue) which is presented concurrent with audio prompts. In embodiments of the present invention, the visual prompts may comprise a visual representation (e.g., a text string) of the audio prompt sent to thin device 110, a portable document format (PDF) file, a joint photographic experts group (JPEG) file, an MPEG file, or the like which may be accessed from, for example, media database 122.

In step 220 of FIG. 2, the visual prompt is sent to the thin device. In embodiments of the present invention, the visual channel used by media stream generating system 120 to communicate with thin device 110 can be used to present visual prompts to the user as well as audio information conveyed by the audio channel. While the present embodiment recites generating prompts for thin devices, it is noted that embodiments of the present invention are well suited for use in other devices such as personal computers, networked computer systems, laptop computer systems, or the like. Additionally, the visual prompts may be conveyed to the thin device, or computer, using a wired communication network, the Internet, a wireless communication network, etc.

In step 230 of FIG. 2, the visual prompt is displayed on the thin device. Embodiments of the present invention advantageously permit simultaneously displaying a plurality of options to users of thin devices which the user can use to quickly navigate large sets of selections and/or without having to remember a specific keying sequence. In embodiments of the present invention, the visual prompts may comprise text, icons, or other visual images. Because the user is not limited to the audio interface alone, the user can use the video interface of thin device 110 to simultaneously view a plurality of options and quickly scroll to a desired selection. Additionally, the user does not have to remember a specific keying sequence when trying to decide which movie to watch as the options are shown on the display of thin device 110.

Figure 3:
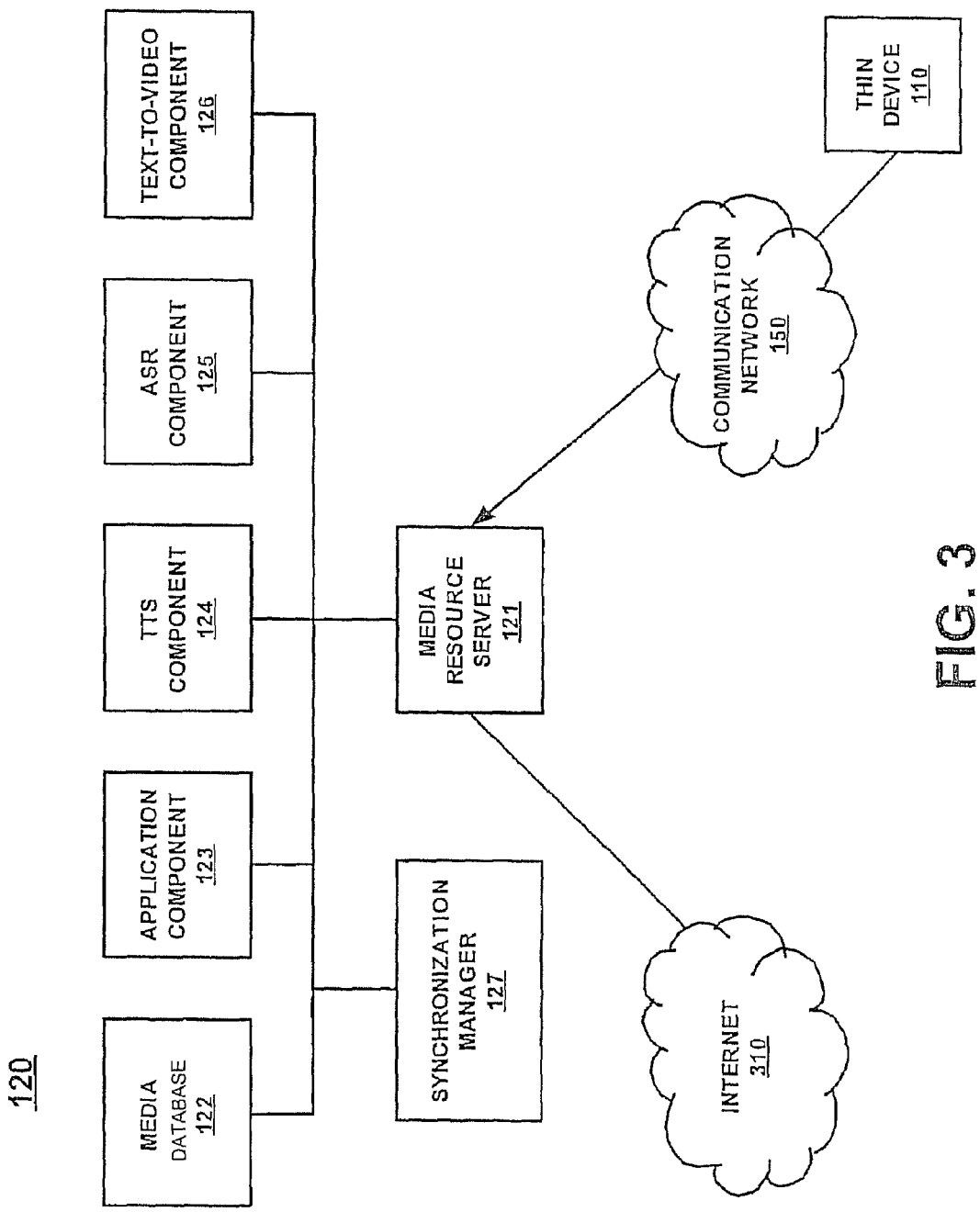
FIG. 3 is a block diagram of a media stream generating system in accordance with embodiments of the present invention.

FIG. 3 is a block diagram of an exemplary media stream generating system 120 in accordance with embodiments of the present invention. In FIG. 3, thin device 110 is communicatively coupled with media stream generating system 120 via communication network 150. A media resource server 121 is communicatively coupled with communication network 150 and is for receiving signals from thin device 110 conveying user requests for modifying an audio media stream and/or a video media stream. Media resource server 121 is further for generating the media stream and/or modified media stream to thin device 110 in embodiments of the present invention. In embodiments of the present invention, media resource server 121 may further comprise a telephone interface for communicating with communication network 150, an interface to Internet 310, and an interface for processing DTMF signals. Media resource server 121 is also communicatively coupled with a media database 122, an application component 123, a text-to-speech (TTS) component 124, an automatic speech recognition (ASR) component 125, a text-to-video component 126, and a synchronization manager 127. It is appreciated that in embodiments of the present invention, system 120 may be configured differently than is shown in FIG. 3. Operation of system 120 will be discussed in greater detail below.

In embodiments of the present invention, multiple media streams may be generated by media stream generating system 120. In one embodiment, an audio media stream and a video media stream are generated which are to be displayed concurrently upon thin device 110. In embodiments of the present invention, the audio and video media may be corresponding content (e.g., the video image displays the phrase, "Mailbox," while the audio output also says, "Mailbox"), related content (e.g., a picture of a car is displayed while the audio output describes the car) or may be unrelated content. However, concurrently presenting multiple media streams on a thin device can lead to scheduling and synchronization problems due to the different processing requirements of the respective media. For example, greater decoding latency of video media streams typically occurs because of the more computer intensive video decoding that must be performed by thin device 110. As a result, a greater lead time is needed in when transmitting video media streams in order to give the thin device 110 sufficient time to process the data.

On the other hand, audio media streams, require much less processing on the part of thin device 110 and are more or less sent in real time from media stream generating system 120. Therefore, synchronizing the offset of the media streams so that they can be presented concurrently at thin device 110 can be problematic, especially with variable bit rate (VBR) media streams because the lead time of transmitting the video can vary relative to the transmission of the audio media.

Figure 4:
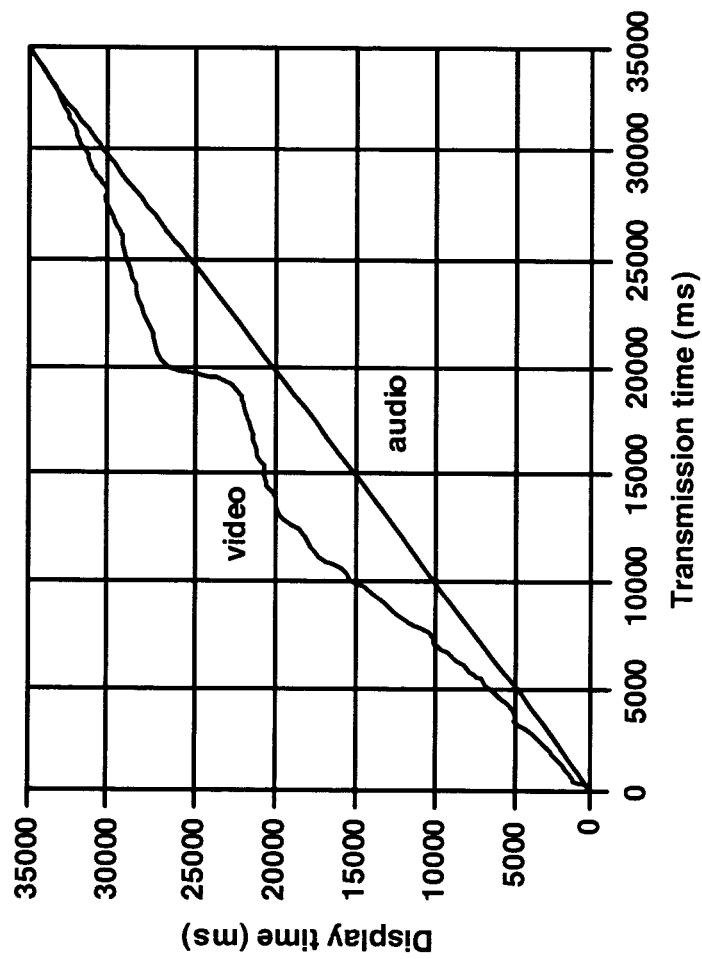
FIG. 4 is a plot showing the display times as a function of transmission time for a hinted MPEG4 file

This is shown in greater detail in FIG. 4 which is a plot showing the display times as a function of transmission time for a hinted MPEG4 file. As shown in FIG. 4, the transmission time of the video media stream relative to the audio stream which is to be concurrently presented can widely vary. For example, for the media streams to be concurrently displayed at the display time of 20000 milli-seconds, the video media stream (e.g., 410) is sent at a transmission time of approximately 14000 milli-seconds while the audio media stream (e.g., 420) which is to be concurrently presented is sent at a transmission time of 20000 milli-seconds. Thus, there is a transmission offset of approximately 6000 milli-seconds at this point. However, at the display time of 23000 milli-seconds, the video media stream (e.g., 410) is sent at a transmission time of approximately 19500 milli-seconds while the audio media stream (e.g., 420) which is to be concurrently presented is sent at a transmission time of approximately 23000 milli-seconds. Thus, there is a transmission offset of approximately 3500 milli-seconds at this point.

Another complication in the timing and synchronization of audio and video media streams is the fact that some thin devices (e.g., cellular telephones) are designed for low-latency communication networks. As a result, the small buffer sizes of these devices necessitate fairly precise synchronization between thin device 110 and media stream generating system 120 to prevent buffer overflow, in which data is lost due to the buffer already being filled, or underflow, in which the data in the buffer is processed before additional streaming media arrives from media stream generating system 120.

Earlier audio codecs used fixed data packet timing wherein each data packet represented, for example, a 20 milli-second time slice. However, (VBR) compressed audio and video codecs (e.g., AMR and MPEG4) do not follow this one-packet/one-time-slice rule. Each packet can cover widely variable time duration, as with discontinuous transmission (DTX) within AMR and variable-frame-rates and multi-packet frames in MPEG4. This requires an explicit tag in each data packet with the time to which it corresponds, called the "display time." RTP timestamps are an example of explicit tagging of data with display times. With VBR compressed media, these display times must be noted when the compression occurs and must travel with the data, from the source through the system and finally to the client display.

There is a related, but distinct type of time associated with each data packet: the transmission time. In file-based content (e.g., video mail, or video on demand (VoD)), all of the data packets are available to be sent from the server to the client at any time that the server chooses. As discussed above, for VBR media, it often makes sense to send some to the data early. This can smooth the transmitted bit rates since, without bit rate smoothing, multi-packet video frames, such as I frames, can flood network interface of thin devices, resulting in lost or delayed packets. Sending the video media packets early relative to the audio packets is also useful for allowing thin device 110 additional time to complete the time consuming video decode process.

For the media streams to be presented concurrently, thin device 110 unpacks, decompresses, and then presents the incoming audio and video streams in a synchronized manner. As an example, thin device 110 may perform this by decoding received audio as it is released from the RTP stack, queuing 20 milli-second buffers for the audio device, with the queue extending for as much as 100 milli-seconds of lead time. This pre-decoding can be used to avoid the pops that could otherwise occur during device-buffer underflow. However, as discussed above, even with this protection, if the audio data is sent to the client at the wrong time, the audio device buffer could overflow or underflow.

Continuing with the above example, in embodiments of the present invention, the audio queue of thin device 110 plays and releases the 20 milli-second buffers, it issues a callback, indicating its progress. The media display application resident on thin device 110 may use this callback to trigger the display of video frames with the corresponding display time. The correspondence between audio and video can be accomplished using the display times represented in the RTP timestamps, using offset synchronizations given in the RTCP packets sent from media stream generating system 120. For example, each RTCP packet may give a pair of RTP timestamps, one for audio and one for video, that correspond to the same display time. Using this information, thin device 110 can map the callback from the released audio buffer RTP time to a range of needed video frame RTP times.

Thus, the timing and synchronization requirements at the video client result in the need not just for fast data processing within media stream generating system 120, but controlled transmission timing and synchronized display of that data. When a user of thin device 110 is allowed to interactively control the playback rate of the final presentation, the different lead times built into the transmission timing, relative to the display time, are exposed. As described above, the video data must be decompressed and waiting at thin device 110 by the time the corresponding audio data is presented so that the callback can display that video data. Since the video is discarded if it is not on thin device 110 and decoded at the audio-dictated time, the video data should be sent early from media stream generating system 120 relative to the corresponding audio data.

While the delays within thin device 110 are the reason why the video is sent early, it is not the latency of thin device 110 that causes possible de-synchronization of the media streams. Instead, de-synchronization arises at media stream generating system 120, due to the interactive commands to change the playback rate. With offset audio and video transmission times, a user generated DTMF, or voice, signal requesting a playback rate change "now" is a poorly defined event. Furthermore, because the video media stream is sent early relative to the corresponding audio media stream, media stream generating system 120 has no control over the video data already sent when the request for a playback rate change is received. Thus, media stream generating system 120 cannot manipulate the media which has already been sent to thin device 110. Furthermore, because of the separated audio/video playback (e.g., using the unmodified client capabilities) and the audio/video interactive control requests (e.g., through in-band signaling) implemented by thin device 110 it is unlikely that the modifications to the media stream can be applied locally. In embodiments of the present invention, media stream generating system 120 may use one of three alternative implementations to provide interactive control of streaming media to a user of a thin device: a decoupled time-scale modification (TSM), a delayed-event TSM, and a delayed-synchronization TSM.

Figure 5:
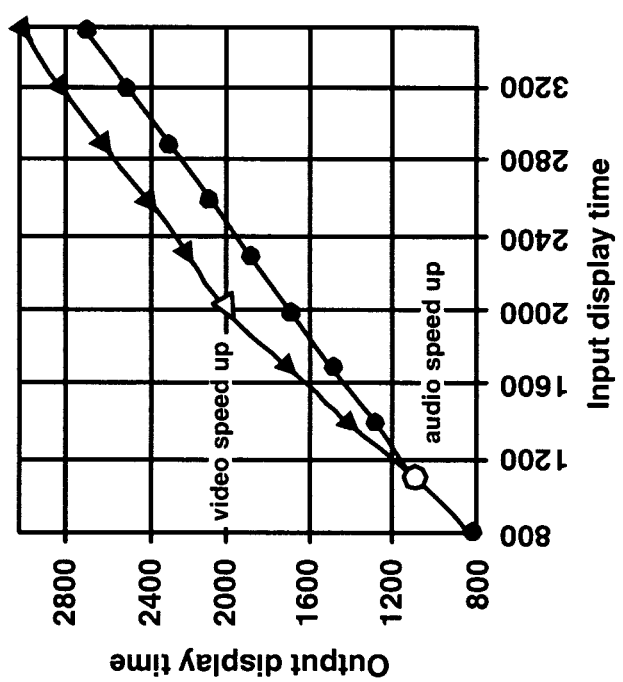
FIG. 5 is a time plot showing output display time as a function of input display time of a decoupled time-scale modification of media streams in accordance with one embodiment of the present invention.

FIG. 5 is a time plot showing output display time as a function of input display time of a decoupled time-scale modification of media streams in accordance with one embodiment of the present invention. It is noted that FIG. 5 shows changes in playback rates of a video media stream and a corresponding audio media stream in response to a user request to increase the playback rate. In FIG. 5, the change in playback rate is reflected in the change of the slope between input (e.g., from media database 122) and output (e.g., to thin device 110) display times. If only one line is shown, the two lines exactly overlap throughout the transmission, corresponding to full synchronization of the audio and video media streams. When the video media plot (e.g., 510) is above the audio media plot (e.g., 520), the two tracks are de-synchronized, with the video being displayed late compared to the original content display.

In de-coupled TSM the playback rate of both the audio media stream and the video media stream is changed immediately, without communication between them, upon receiving the user request to increase the playback rate. In embodiments of the present invention, control of the playback rate of the audio and video media streams is performed by synchronization manager 127. In FIG. 5, media stream generating system 120 receives a request from thin device 110 to increase the playback speed from the normal speed (e.g., 1×) to a 50% faster playback rate (e.g., 1.5×) at 1000 milli-seconds. At a schedule time of 1000 milli-seconds on media stream generating system 120, the video media stream with a display time of 2000 milli-seconds could already have been sent from media stream generating system 120, to insure prompt arrival and decoding of the video, while the audio media stream is transmitting data with a display time of 1100 milli-seconds.

Speeding up the audio media stream by a factor of 1.5 will change what was a 900 milli-seconds of data (2000 milli-seconds–1100 milli-seconds) into only a 600 milli-seconds of data (900/1.5) If this reduction in audio data is not corrected, the audio and video streams will de-synchronize for the remainder of playback by 300 milli-seconds. As shown in FIG. 5, the slopes of the media tracks change to different rates as soon as the speed-up request arrives at media stream generating system 120. Due to the differences in the transmission-display mappings, this event time corresponds to two distinct display, or presentation, times on the audio and video tracks. Since the mappings, from the input-to-output display times changed slopes at two different input display times, the after speed-up display of audio and video will always be de-synchronized, even though thin device 110 is using the correct RTP mapping logic. In other words, because of the offset in transmission times for corresponding video and audio media streams, immediately speeding up both media streams results in thin device 110 displaying the normal speed streaming video media while the sped-up audio media stream is arriving, thus resulting in a de-synchronization of what should be corresponding media streams.

Figure 6:
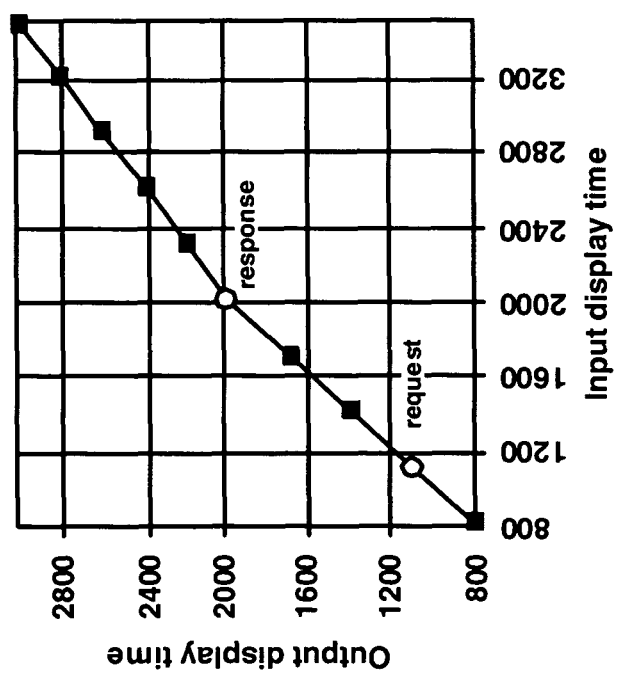
FIG. 6 is a time plot showing output display time as a function of input display time of a delayed-event time-scale modification of media streams in accordance with another embodiment of the present invention.

FIG. 6 is a time plot showing output display time as a function of input display time of a delayed-event time-scale modification of media streams in accordance with another embodiment of the present invention. In embodiments of the present invention, one method for avoiding the de-synchronization described above is to delay the implementation of a playback rate change in one of the media streams before applying that rate change to the corresponding media stream. In other words, upon receiving a request for a playback rate change (e.g., at approximately 1000 milli-seconds), synchronization manager 127 of media stream generating system 120 immediately applies that rate change to the video media stream, thus creating a modified video media stream, and notes the video display time at which that change was made. Media stream generating system 120 then creates a delayed rate-change for the audio media stream for the equivalent display time in the audio stream. Thus, rather than applying the change to the audio stream immediately upon receipt of the user request, the modification to the audio media stream is delayed until it will be presented concurrent with the modified video media stream (e.g., at 2000 milli-seconds). In other words, media stream generating system 120 determines the timing offset of the two media streams and delays implementing the modification of the audio media stream for a period equal to that offset. For the user of thin device 110, the display of audio and video remains correctly synchronized throughout the rate change process, but there is a delay before the user sees, or hears, the rate change modification.

As an example, upon receiving the user request for a playback rate change, media stream generating system 120 notes the request occurs at the video display time of 2000 milli-seconds and immediately applies the requested rate change to the media stream. Because there is a 900 milli-second offset between the transmission of the video media stream and the audio media stream, media stream generating system 120 delays implementing the requested modification to the audio media stream for 900 milli-seconds before generating the modified audio media stream. While delayed-event TSM has the advantage of keeping the video and audio media streams synchronized throughout the transmission, it can give the user of thin device 110 the perception that their input command was not correctly processed, especially if bandwidth smoothing requirements necessitate a large offset between the transmission of the video media stream and the audio media stream.

Figure 7:
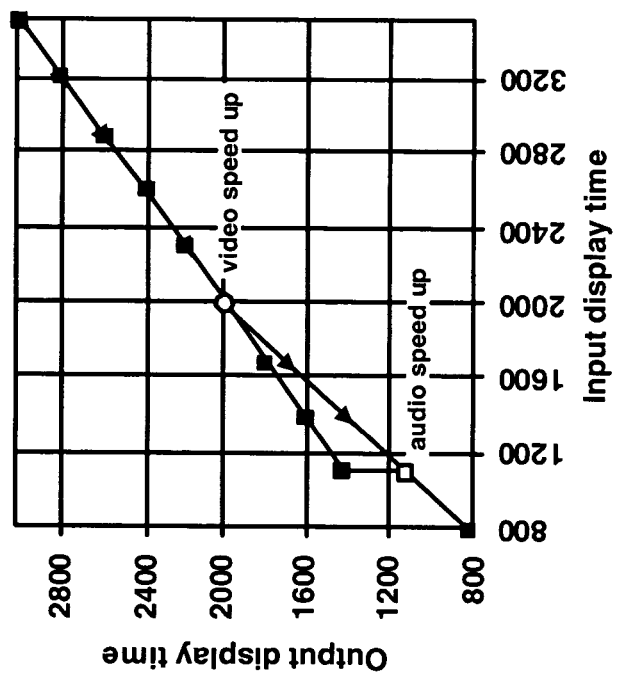
FIG. 7 is a time plot showing output display time as a function of input display time of a delayed-synchronization time-scale modification of media streams in accordance with one embodiment of the present invention.

FIG. 7 is a time plot showing output display time as a function of input display time of a delayed-synchronization time-scale modification of media streams in accordance with one embodiment of the present invention. In this embodiment of the present invention, de-synchronization of the media streams is avoided by applying a delayed-synchronization TSM. In other words, upon receiving a request for a playback rate change at approximately 1000 milli-seconds), synchronization manager 127 of media stream generating system 120 immediately applies that rate change to both the video media stream and the audio media stream, noting the display times, which are offset, for both media streams. As noted above, unless corrected further, this results in the audio media being played back at thin device 110 earlier than the corresponding video media. To avoid this long-term de-synchronization, media stream generating system 120 inserts the correct amount of silence into its audio output stream to thin device 110. Using the example of FIG. 5, media stream generating system 120 inserts 300 milli-seconds of silence into the audio media stream being sent to thin device 110. Initially, the video media stream and the audio media stream are de-synchronized because the audio media stream is being played late relative to the video media stream by 300 milli-seconds. Then, over the course of the next 600 milli-seconds, the audio and video media gradually re-synchronize as the audio is being played back faster than the video, which is still being played at real time (e.g., the real-time video media stream is still being processed at thin device 110). After 900 milli-seconds, synchronization of the audio and video media streams is restored and the video would begin to play faster than real time at a time of 2000 milli-seconds.

To the user of thin device 110, after sending the request for a playback rate change, the user will perceive an almost immediate silence of the audio media while the video continues to play at real time. Advantageously, this gives the user an immediate perception that their request is being processed. After 300 milli-seconds of silence, the audio stream will be playing at the requested speed (e.g., 1.5×) while the video will still be playing in real time. During this time, the audio and video will not be synchronized and the audio media will be playing faster than the video media. However, eventually the modified video media will begin to be displayed at thin device 110, at which time the audio and video media will again be synchronized. Thus, to the user of thin device 110, there is a continuity of the video image and an interruption of the audio output. Providing video discontinuity may be implemented if the video media output by media stream generating system 120 is not predictively encoded.

If the user is requesting a reduction of the playback rate, media stream generating system 120 immediately applies that rate change to both the video media stream and the audio media stream, noting the display times, which are offset, for both media streams. As noted above, unless corrected further, this results in the audio media being played back at thin device 110 earlier than the corresponding video media. To avoid de-synchronization, media stream generating system 120 encodes subsequent video frames with display (RTP) timestamps that are artificially delayed, introducing a "suspend" or "freeze" in the video stream at the thin device. Using the example of FIG. 5, when slowing from normal speed to ⅔ normal speed, media stream generating system 120 delays the video it thereafter sends to thin device 110 for the 450 ms (=900/(⅔−$^{900}$/₁). This delay occurs both in display time and in transmission time. The audio and video gradually de-synchronize as the audio is being played back slower than the video, which is still being played at real time. After 900 ms, synchronization of the audio and video media streams starts to be restored, since the video is frozen and the audio continues to play back slowly. After 1350 ms, synchronization is fully restored and the video and audio both play out at the slowed rate.

Thus, embodiments of the present invention provide a method and system for interactively controlling streaming media from a thin device which provides a sufficient impression of responsiveness to the user while maintaining synchronization of multiple media streams. While the synchronization of an audio and a video media stream are described, it is appreciated that multiple video media streams, or multiple audio media streams may be presented to the user of thin device 110. For example, if thin device 110 is being used in a video conference, the user could switch between audio channels to focus on the participant that is currently speaking. Furthermore, embodiments of the present invention are compatible with existing telecommunication network interfaces and protocols. Additionally, embodiments of the present invention can be implemented without necessitating the installation of special client software onto the thin device.

Improving Interactive Media Response Systems Using Visual Cues

Another advantage of embodiments of the present invention is that media stream generating system 120 can be used to implement an interactive media response system. This is advantageous over current interactive voice applications (e.g., voice mail access, or airline reservation systems) because the video channel can be used to present multiple choices, or "visual prompts," to the user of thin device 110 at the same time. In embodiments of the present invention, nested selections sets can be presented to a user using text or icon based menus that can be used to quickly navigate the application.

Conventional interactive voice applications are limited to presenting options to a user serially as it is difficult for a user to listen to multiple audio sources at the same time. As a result, a user may be forced to wait until a desired option is presented via the audio interface, remember a complex keying sequence to access a desired result, or to remember a large set of options before deciding which option they wish to select. As an example, if a user of a thin device wants to watch a movie, the user calls an interactive voice application which recites the available movie titles serially. Frequently, there are hundreds of available movie titles from which the user can choose. Thus, the user may be forced to wait an unreasonable length of time until the voice application recites the movie title the user wants to watch. A more likely result is that the user simply disconnects from the system out of frustration rather than wait for the desired movie title to be recited. Also, the user may have a difficult time remembering more than one keying sequence for a selection when trying to choose between available options. For many users, an interactive voice application may be difficult to use when describing a mapping of functions to the keypad of the thin device. For example, if thin device 110 is used to play a movie, a user would have to memorize the mapping of playback options to the keypad of thin device 110. Thus, an interactive voice application might tell the user to press 4 to rewind, press 5 to play, press 6 to fast forward, press 7 to repeat, press 8 to delete, etc. before starting playback of the movie. However, many users would find it difficult to remember these mappings for an extended period.

In embodiments of the present invention, the visual channel used by media stream generating system 120 to communicate with thin device 110 can be used to present visual prompts to the user as well as audio information conveyed by the audio channel. Thus, embodiments of the present invention permit simultaneously displaying a plurality of options to users of thin devices which the user can use to quickly navigate large sets of selections and/or without having to remember a specific keying sequence. In embodiments of the present invention, the visual prompts may comprise text, icons, or other visual images. Thus in embodiments of the present invention, if a user wants to view a movie using thin device 110 they can view a list of available titles and scroll through the list until they find the movie they would like to watch. Because the user is not limited to the audio interface alone, the user can use the video interface of thin device 110 to quickly scroll to a desired selection. Additionally, the user does not have to remember a specific keying sequence when trying to decide which movie to watch as the options are shown on the display of thin device 110.

In embodiments of the present invention, the information presented over the video channel is presented concurrently with audio information. For example, the audio channel may convey the message, "You have 2 messages in your in-box," while the video channel presents the corresponding message, "You have 2 messages in your in-box." Alternatively, the information may be related, but not exactly corresponding data. As an example, a user may contact a car rental agency which lists what car models are available while simultaneously displaying pictures of the cars to the user of thin device 110. In another example, the audio channel may convey the message, "You have 2 message in your in-box," while the video channel presents the message:

"Call 1, from Mary 415 123 4567"

"Call 2, from George 415 123 4568"

Thus, the information which is visually displayed, while correlated, is not an exact match of the information presented over the audio channel. Additionally, the visual display can include information which is not typically presented over conventional audio only interfaces. For example, a user of thin device 110 can quickly determine if a voice message has been flagged as a priority message using embodiments of the present invention. In another embodiment of the present invention, un-related data can be presented concurrent with the audio data, if a user of thin device 110 is put on hold, the audio channel may play music while the video channel conveys an advertisement, movie trailer, a game, etc, to the user. While the present embodiment recites that the visual prompts are displayed on thin device 110 concurrent with an audio prompt, it is noted that embodiments of the present invention are well suited for displaying visual prompts on thin device 110 independent of any audio prompts.

In embodiments of the present invention, dynamic generation of the visual prompts is facilitated by accessing the markup information generated by a VoiceXML application (e.g., application component 123 of FIG. 3). For example, VoiceXML is a markup language frequently used in telecommunication Interactive Voice Responsive (IVR) messaging, Voice portals, and entertainment applications to describe the media presentation sequence and the coordinated, time-varying interpretation of incoming signals. VoiceXML+extends this markup language to support coordinated audio and video presentation, thus allowing the use of the video channel as a way to convey visual prompts to users of thin device 110. In embodiments of the present invention, application component 123 generates VoiceXML text strings which are used by TTS component 124 when presenting audio prompts via thin device 110. In embodiments of the present invention, application component 123 also generates VoiceXML text strings which are used by text-to-video component 126 to generate visually appropriate a visual representation which is presented concurrent with audio prompts. In embodiments of the present invention, the visual prompts may comprise a visual representation of the audio prompt sent to thin device 110, a portable document format (PDF) file, a joint photographic experts group (JPEG) file, an MPEG file, or the like which may be accessed from, for example, media database 122. In embodiments of the present invention, application component 123 can access data from a media component, such as media database 122, TTS component 124, ASR component 125, and/or Internet 310 when generating the VoiceXML text strings.

Figure 8:
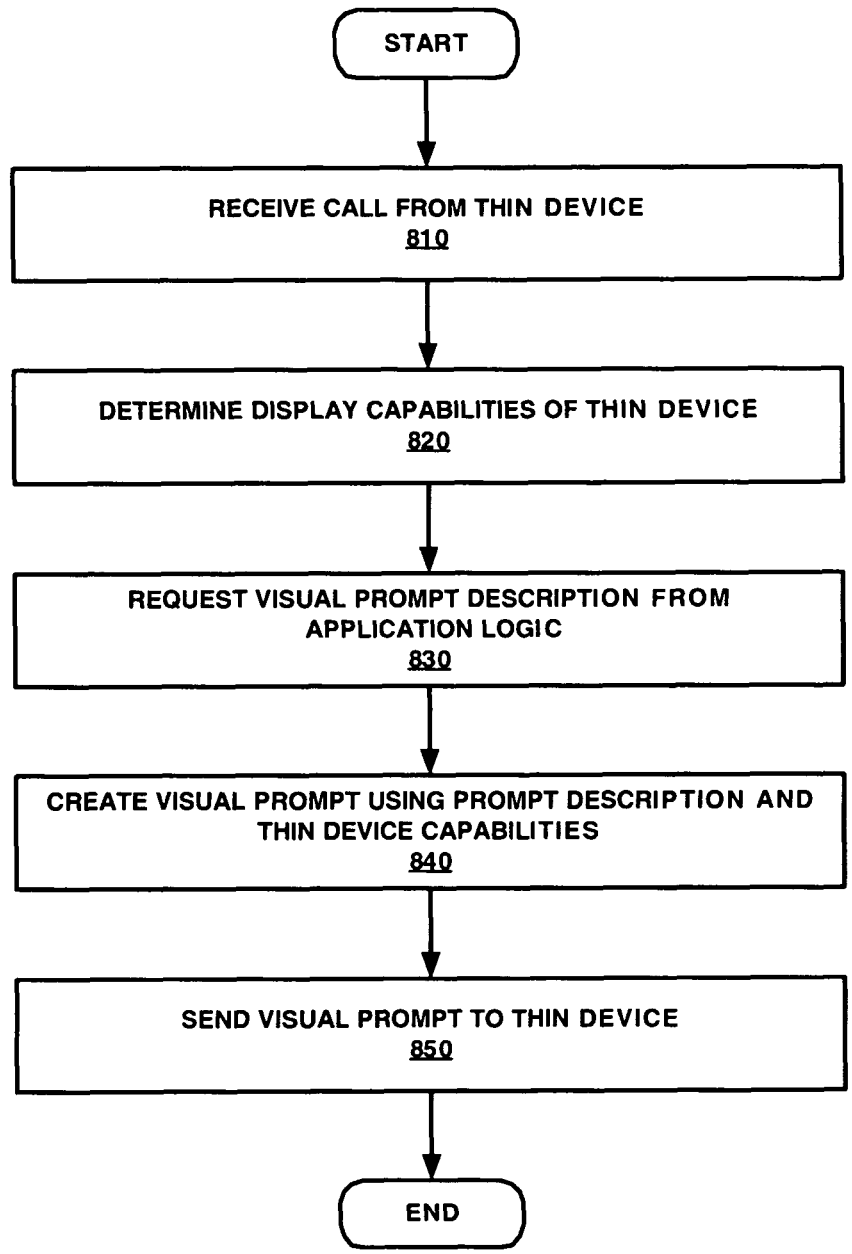
FIG. 8 is a flowchart of a process for generating a visual prompt in accordance with embodiments of the present invention.

FIG. 8 is a flowchart of a process for generating a visual prompt in accordance with embodiments of the present invention. In step 810, a call is received from a thin device. Referring again to FIG. 3, a user causes thin device 110 to contact media stream generating system 120. For exemplary purposes, it is assumed that the user is accessing a voice mail application resident on media resource server 121. However, it is understood that embodiments of the present invention are not limited to this type of data access alone.

In step 820 of FIG. 8, the display capabilities of the thin device are determined. In one embodiment of the present invention, upon establishing communication with thin device 110, media stream generating system 120 generates a message to determine the display capabilities of thin device 110. This may include screen size, resolution, processor capabilities of the thin device, etc.

In step 830 of FIG. 8, a request for a visual prompt description is generated. In response to a user's request to access their voice mail, media resource server 121 accesses the user's voice mail account. In embodiments of the present invention, upon accessing the user's voice mail account, media resource server 121 accesses the file of that user's voice mail account to create a summary of the user's in-box and generates a request for a VoiceXML markup of that data in order to create voice prompts using TTS component 124. Using application state data sent by media resource server 121, application component 123 generates VoiceXML text strings which are then used by TTS component 124 to convert the VoiceXML text strings into audio messages for the user of thin device 110.

In embodiments of the present invention, text-to-video component 126 generates a request for a visual prompt description to application component 123 for a visual prompt that will be displayed concurrent with the presentation of the audio messages. In embodiments of the present invention, when generating the text strings used by TTS component 124, application component 123 generates VoiceXML text strings which designate the media source of the visual prompt that is to be displayed concurrent with the audio message. While the present embodiment recites that the visual prompt is to be presented concurrent with an audio prompt, it is noted that in embodiments of the present invention, the visual prompt may be generated alone without accompanying audio information.

In step 840 of FIG. 8, visual prompt is created using the prompt description sent by application component 123 and based upon the display capabilities of the thin device. Using the VoiceXML prompt description generated by application component 123, text-to-video component 126 creates a visual prompt based upon the display capabilities of thin device 110. In other words, application component 123 appends tags to data from the user's voice mail in-box for rendering visual information on thin device 110. For example, the VoiceXML prompt description may comprise file descriptions of JPEG images (e.g., icons) stored in media database 122. If, for example, it is determined that thin device 110 can only display 3 icons at one time, text-to-video component 126 will limit the size of the visual prompt sent to thin device 110. Thus, the user may be presented with multiple "pages" of visual prompts depending upon the display capabilities of thin device 110 and the number of messages in their voice mail in-box. Alternatively, the visual prompt may simply be a visual representation of the transcript created by TTS component 124. Again, it is noted that while the present embodiment recites that the visual prompt is related to the audio prompt presented to the user of thin device 110, embodiments of the present invention are well suited for displaying a visual prompt that is un-related to the audio prompt.

As stated above, application state information can be accessed by media resource server 121 and sent to application component 123. Thus, application component 123 can generate visual prompt descriptions that are tailored to the current status of the application being accessed by thin device 110. As a result, in response to what is being displayed upon thin device 110, user commands (e.g., DTMF signals or voice signals) can be used to control the application currently being accessed. Returning to the present example, the visual prompt for the user's voice mail in-box can show who has left messages, the phone number that they called from, what time the message was left, whether the message has a priority status assigned to it, etc.

In step 850 of FIG. 8, the visual prompt is sent to the thin device. In embodiments of the present invention, text-to-video component 126 sends the visual prompts to media resource server 121 which then forwards the visual prompts concurrent in time to be displayed concurrent with the appropriate audio prompt.

Enhancing the Quality of Visual Prompts

In embodiments of the present invention, prior knowledge of the video codecs used by thin device 110 can be leveraged to improve the display quality of text prompts. For example, knowing in advance that the video codecs used are block based codecs (e.g., MPEG4, or H.263) and that text is going to be displayed on thin device 110, the position of the letters can be adjusted to take advantage of encoding boundaries of the blocks to increase the sharpness of the letters. This is possible because, in block based video codecs, blocking artifacts occur at the boundaries between blocks of pixels such as MPEG blocks, or direct cosine transform (DCT) blocks. These boundaries are caused by the fact that each block is encoded using separate quantizers on the low frequencies. Because these quantizers do not result in equal values showing up on the two abutting block edges, it looks like a line on the display. Typically, these lines are not desired because there are not real lines in the content that line up with the block edges. However, in embodiments of the present invention, prior knowledge that text is to be displayed allows using the lines at the boundaries of these blocks to create sharper edges on the displayed letter, thus increasing the sharpness of the displayed text. In conventional systems, no notation is made as to whether text or an image is being rendered. Therefore, an aggregate solution to rendering is utilized which does not optimize the rendering of text or images.

Figure 9:
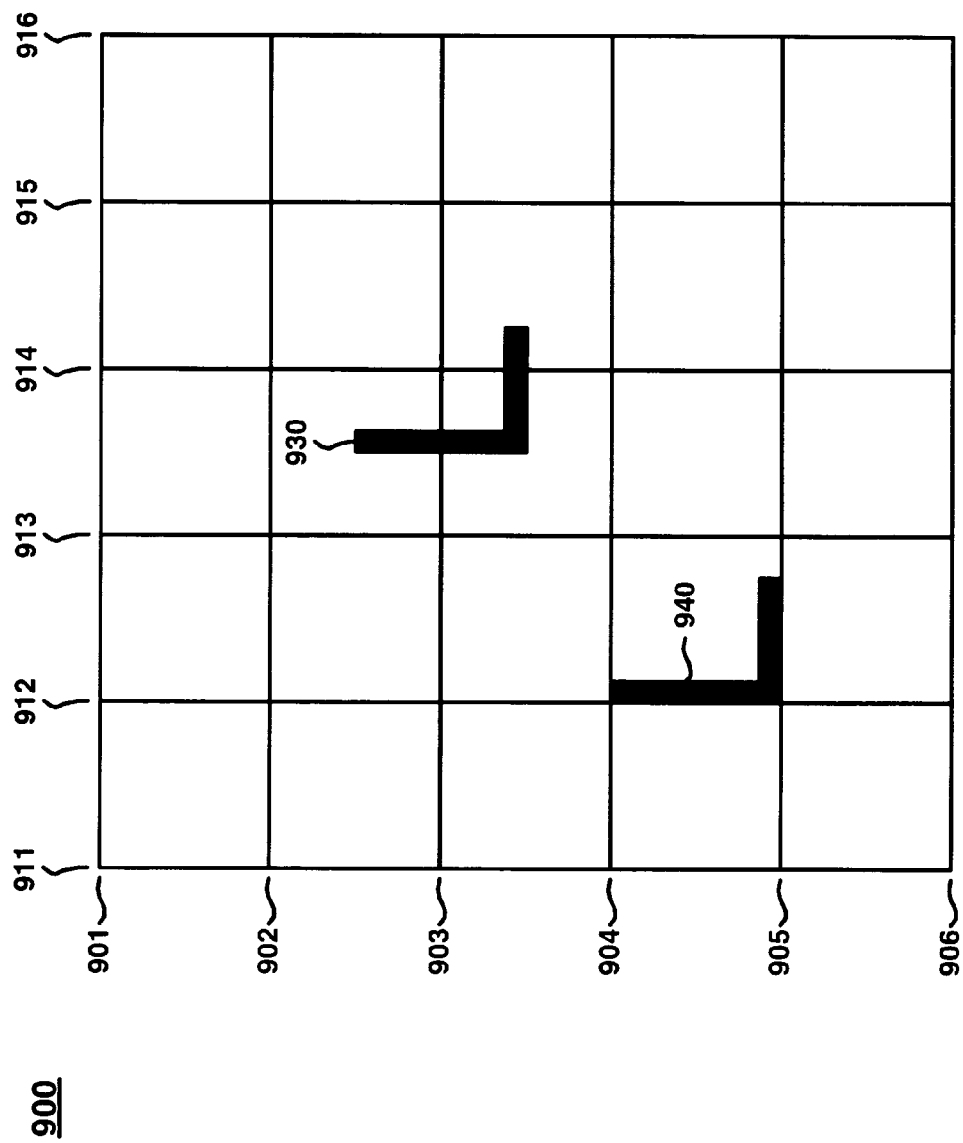
FIG. 9 shows the alignment of a rendered character relative to a blocking artifact in accordance with embodiments of the present invention.

FIG. 9 shows the alignment of a rendered character relative to a blocking artifact in accordance with embodiments of the present invention. In FIG. 9 a plurality of video blocks are shown which are defined by horizontal boundaries (e.g., 901, 902, 903, 904, 905, and 906) and vertical boundaries (e.g., 911, 912, 913, 914, 915, and 916). As described above, because each of the blocks are encoded using separate quantizers, the horizontal and vertical boundaries appear as well defined lines in the display.

In conventional display implementations, the output quality can be hard to read because the text is simply processed as a bitmap image, without taking into account that it will be shown in an encoded bit stream. As a result, a letter (e.g., 930) may be rendered in the middle of a block. Because video codecs typically downgrade high frequency information, a letter rendered at the center of a block will appear blurred. However, in embodiments of the present invention, the positioning of the letter can be adjusted so that an edge of it is aligned with a vertical and/or horizontal boundary between two blocks. As shown in FIG. 9, letter 940 is positioned so that the left edge of the vertical bar is aligned with vertical boundary 912 and the bottom edge of its horizontal bar is aligned with horizontal boundary 905. Thus, in knowing the video codec used on thin device 110, a spatial map of the boundaries of the blocks can be created which is used when generating the text in order to increase the sharpness of the rendered text. It is noted that for the purposes of the present invention, a text prompt may comprise numbers, letters, and/or other characters other than a picture.

In embodiments of the present invention, the characters can be moved closer together or farther apart to take advantage of the blocking artifacts by performing a jitter of a single letter, a plurality of letters, or a whole line of letters. In embodiments of the present invention, the browser page generator (e.g., media resource server 121) which sends the video data to thin device 110 can perform a sample layout of the rendered text to determine a configuration of the letters of a text line such that the letters are aligned with the block boundaries. Additionally, in embodiments of the present invention, media resource server 121 can pre-compute sets of coefficients for representing letters. For example, knowing that the characters are to be rendered in a certain font and size, media resource server 121 can pre-compute the coefficients for rendering that character in a certain position within a video block. In other words, knowing that the position of the character can be adjusted such that it will be aligned with the boundaries of the block, media resource server 121 can compute the coefficients for that block and send them in the bit stream to thin device 110 without having to perform a sample layout of that line of characters. In so doing, the load computational load on media resource server 121 can be reduced.

Embodiments of the present invention may also perform a spatial bit allocation prioritization of characters, in which the number of data bits allocated to each block may be changed based upon whether text or an image is displayed in that block. For example, when displaying a picture or other image, less high frequency information is needed than when displaying a letter or character. Thus, in embodiments of the present invention, a greater bit allocation is given to blocks displaying a letter or character than is allocated to blocks displaying an image. Additionally, embodiments of the present invention may emphasize some portions of text by assigning a greater bit allocation to text which is prioritized over other portions. For example, when displaying a voice mail in-box, greater emphasis can be given to the name of a caller than is given to the time at which they called by allocating more data bits to the characters of that caller's name. In embodiments of the present invention, classification of which characters are to be emphasized can be facilitated using, for example, HTML headers, VoiceXML text strings, or some other notation appended to the text which identify sections of text.

Embodiments of the present invention may also perform a temporal bit allocation prioritization of characters, in which the number of data bits allocated to video frames may be changed based upon whether text or an image is being displayed. For example, because the characters are typically displayed in a static position, there is little if any motion between video frames. Thus, a greater number of bits can be allocated to the intra-coded frames (I frames) which do not rely upon data from other frames of data. In moving images, predictive frames (P frames) and bi-directional predictive frames (B frames) are used to convey the motion of an object described in an I frame. Because the text characters typically do not move, there is less need for data bit allocation to the P frames and B frames. Thus, in embodiments of the present invention, a greater allocation of data bits to the I frames can be made when displaying text characters than would be allocated to an I frame used in a general video sequence. As a result, the rendered characters are sharper than in conventional browser generators which do not prioritize the allocation of data bits based upon whether an image or text is being rendered.

Figure 10:
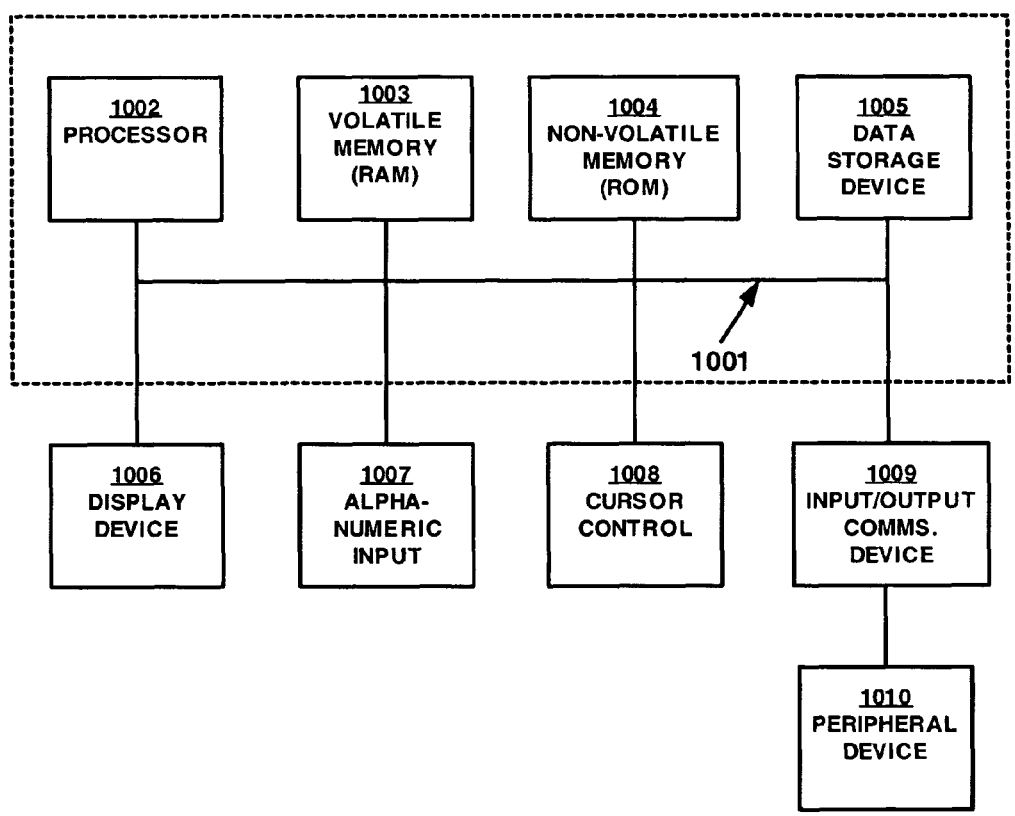
FIG. 10 is a block diagram of an exemplary computer system utilized in accordance with embodiments of the present invention.

With reference to FIG. 10, portions of the present invention are comprised of computer-readable and computer-executable instructions that reside, for example, in computer system 1000 which is used as a part of a general purpose computer network (not shown). It is appreciated that computer system 1000 of FIG. 10 is exemplary only and that the present invention can operate within a number of different computer systems including general-purpose computer systems, embedded computer systems, laptop computer systems, hand-held computer systems, and stand-alone computer systems.

In the present embodiment, computer system 1000 includes an address/data bus 1001 for conveying digital information between the various components, a central processor unit (CPU) 1002 for processing the digital information and instructions, a volatile main memory 1003 comprised of volatile random access memory (RAM) for storing the digital information and instructions, and a non-volatile read only memory (ROM) 1004 for storing information and instructions of a more permanent nature. In addition, computer system 1000 may also include a data storage device 1005 (e.g., a magnetic, optical, floppy, or tape drive or the like) for storing vast amounts of data. It should be noted that the software program for interactively controlling media of the present invention can be stored either in volatile memory 1003, data storage device 1005, or in an external storage device (not shown).

Furthermore, computer system 1000 can include an input/output (I/O) signal unit (e.g., interface) 1009 for interfacing with a peripheral device 1010 (e.g., a computer network, modem, mass storage device, etc.). Accordingly, computer system 1000 may be coupled in a network, such as a client/server environment, whereby a number of clients (e.g., personal computers, workstations, portable computers, minicomputers, terminals, etc.) are used to run processes for performing desired tasks. In particular, computer system 1000 can be coupled in a system for interactively controlling media.

The preferred embodiment of the present invention, a method and system for improving interactive media response systems using visual cues, is thus described. While the present invention has been described in particular embodiments, it should be appreciated that the present invention should not be construed as limited by such embodiments, but rather construed according to the following claims.

What is claimed is:

1. An interactive media response method comprising:
determining, by a media stream generation system, a video compression standard used by a thin device, wherein the media stream generation system is connected to the thin device via a network;
generating media at the media stream generation system using the determined video compression standard, wherein said media stream generation system provides interactive control of said generated media by utilizing a software application resident in said media stream generation system to modify said generated media subsequent to said media generation, said generated media comprising:
a compressed visual prompt for display on said thin device using the determined video compression standard; and
an audio prompt for presentation on said thin device;
determining, by the media stream generation system, whether the video compression standard used by the thin device is a block-based video compression standard;
in response to a determination that the video compression standard used by the thin device is a block-based video compression standard, the media stream generation system adjusting positions of text characters included in the compressed visual prompt based on block boundaries of the block-based video compression standard, wherein the adjusting comprises computing rendering coefficients of the text characters included in the compressed visual prompt;
sending the rendering coefficients, said compressed visual prompt, and said audio prompt from the media stream generation system to said thin device via the network, wherein said sending of said compressed visual prompt and said audio prompt are synchronized based on a correlation of said compressed visual prompt and said audio prompt;
decompressing, by the thin device, the compressed visual prompt using the determined video compression standard to generate a decompressed visual prompt; and
displaying the decompressed visual prompt on said thin device.

2. The method as recited in claim 1 further comprising:
presenting said audio prompt and said visual prompt concurrently on said thin device.

3. The method as recited in claim 1, further comprising:
for each block of a plurality of blocks included in the compressed visual prompt, allocating a quantity of data bits to the block based on whether the block includes a text character.

4. The method as recited in claim 1 wherein said generating further comprises:
receiving a description of said visual prompt from a text string generator; and
generating said compressed visual prompt based upon said description.

5. The method as recited in claim 4 wherein said visual prompt conveys options for controlling a streaming media application accessed by said thin device.

6. The method as recited in claim 5 wherein the information conveyed in said decompressed visual prompt corresponds to the information conveyed in said audio prompt.

7. The method as recited in claim 1, wherein the video compression standard used by the thin device is a Motion Pictures Experts Group 4 (MPEG4) standard.

8. The method as recited in claim 1, wherein the video compression standard used by the thin device is an H.263 standard.

9. An interactive media response system comprising:
a thin device; and
a media stream generating system connected to the thin device, the media stream generating system to:
determine a video compression standard used by the thin device;
generate compressed media for said thin device using the determined video compression standard, said compressed media comprising compressed video content and an audio prompt for presentation on the thin device, the compressed video content including a visual prompt to be displayed upon said thin device, wherein the media stream generation system uses a software application to provide interactive control of the generated compressed media;
determine whether the video compression standard used by the thin device is a block-based video compression standard;
in response to a determination that the video compression standard used by the thin device is a block-based video compression standard, adjust positions of text characters included in the compressed video content visual prompt based on block boundaries of the block-based video compression standard, comprising a computation of rendering coefficients of the text characters included in the visual prompt; and
transmit the compressed media and the rendering coefficients to the thin device via a network connection;
the thin device to decompress the compressed video content using the video compression standard to generate decompressed video content, and to display the decompressed video content on a display of the thin device.

10. The interactive media response system of claim 9, the media stream generating system to:
for each block of a plurality of blocks included in the compressed media, allocate a quantity of data bits to the block based on whether the block includes a text character.

11. The interactive media response system of claim 9 wherein the video compression standard used by the thin device is an H.263 standard.

12. The interactive media response system of claim 9 wherein said media stream generating system comprises:
a visual prompt description generator for generating a description of the visual prompt included in the compressed media.

13. The interactive media response system of claim 12 wherein said visual prompt description generator comprises a text string generator.

14. The interactive media response system of claim 12 wherein said visual prompt conveys options for controlling a streaming media application accessed by said thin device via said streaming media generating system.

15. The interactive media response system of claim 14 wherein the information conveyed in said visual prompt corresponds to information conveyed in the audio prompt included in the compressed media.

16. The interactive media response system of claim 9 wherein the video compression standard used by the thin device is a MPEG4 standard.

17. The interactive media response system of claim 15 wherein the information conveyed in said visual prompt is un-related to the information conveyed in said audio prompt.

18. A media stream generating method comprising:
determining, by a media system, a video compression standard used by a thin device, wherein the thin device is connected to the media system;
generating, by the media system, compressed media for said thin device using the determined video compression standard, the compressed media including a visual prompt and an audio prompt to be presented on the thin device, wherein the media system uses a software application to provide interactive control of the generated compressed media;
determining, by the media system, whether the video compression standard used by the thin device is a block-based video compression standard;
in response to a determination that the video compression standard used by the thin device is a block-based video compression standard, adjusting positions of text characters included in the visual prompt based on block boundaries of the block-based video compression standard, wherein the adjusting comprises computing rendering coefficients of the text characters included in the visual prompt;
transmitting, by the media system, the compressed media and the rendering coefficients to the thin device via a network connection;
decompressing, by the thin device, the compressed media using the video compression standard to generate decompressed media; and
presenting the decompressed media on the thin device.

19. The media stream generating method of claim 18, further comprising:
for each block of a plurality of blocks included in the compressed media, allocating a quantity of data bits to the block based on whether the block includes a text character.

20. The media stream generating method of claim 18 further comprising:
generating a description of said visual prompt.

21. The media stream generating method of claim 20 wherein generating the description of said visual prompt comprises generating text strings using a text string generator.

22. The media stream generating method of claim 21 wherein said visual prompt conveys options for controlling a streaming media application accessed by said thin device.

23. The media stream generating method of claim 18 wherein the video compression standard used by the thin device is a MPEG4 standard.

24. The media stream generating method of claim 18 wherein the video compression standard used by the thin device is an H.263 standard.

25. The media stream generating method of claim 18 wherein the information conveyed in said visual prompt is un-related to the information conveyed in said audio prompt.

26. A non-transitory computer usable medium having computer readable program code embodied therein for causing a computer system to perform a method, said method comprising:
determining a video compression standard used by a thin device;
generating compressed media at a media stream generation system, said compressed media comprising a visual prompt and an audio prompt for presentation on said thin device, wherein the media stream generation system includes a software application to provide interactive control of the generated compressed media;

determining whether the video compression standard used by the thin device is a block-based video compression standard;

in response to a determination that the video compression standard used by the thin device is a block-based video compression standard, adjusting positions of text characters included in the visual prompt based on block boundaries of the block-based video compression standard, the adjusting comprising computing rendering coefficients of the text characters included in the visual prompt; and sending the compressed media and the rendering coefficients to said thin device, wherein the thin device is to decompress the compressed media using the video compression standard to generate a decompressed visual prompt, and to display said decompressed visual prompt on a display of said thin device.

27. The computer usable medium of claim 26, wherein the thin device is to present the audio prompt and said decompressed visual prompt concurrently on said thin device.

28. The computer usable medium of claim 26, the method comprising:

for each block of a plurality of blocks included in the compressed media, allocating a quantity of data bits to the block based on whether the block includes a text character.

29. The computer usable memory of claim 26 wherein the video compression standard used by the thin device is a MPEG4 standard.

30. A computer system comprising:

a bus;

a memory unit coupled to said bus; and a processor coupled to said bus, said processor for executing a method, said method comprising:

determining a video compression standard used by a thin device connected to the computer system;

generating compressed media for the thin device using the determined video compression standard, the compressed media including a visual prompt and an audio prompt for presentation on the thin device, wherein the computer system uses a software application to provide interactive control of the generated compressed media;

determining whether the video compression standard used by the thin device is a block-based video compression standard;

in response to a determination that the video compression standard used by the thin device is a block-based video compression standard, adjusting positions of text characters included in the visual prompt based on block boundaries of the block-based video compression standard, comprising computing rendering coefficients of the text characters included in the visual prompt; and sending the compressed media and the rendering coefficients to said thin device via a network connection, wherein the thin device is to decompress the compressed media using the video compression standard to generate a decompressed visual prompt, and to display said decompressed visual prompt on said thin device.

31. The computer system of claim 30, the method further comprising:

presenting the audio prompt and said decompressed visual prompt concurrently on said thin device.

32. The computer system of claim 30, the method further comprising:

for each block of a plurality of blocks included in the compressed media, allocating a quantity of data bits to the block based on whether the block includes a text character.

33. The computer system of claim 30 wherein the video compression standard used by the thin device is an H.263 standard.

* * * * *

UNITED STATES PATENT AND TRADEMARK OFFICE
CERTIFICATE OF CORRECTION

PATENT NO. : 9,955,205 B2
APPLICATION NO. : 11/149719
DATED : April 24, 2018
INVENTOR(S) : Michele Covell et al.

Page 1 of 1

It is certified that error appears in the above-identified patent and that said Letters Patent is hereby corrected as shown below:

In the Claims

In Column 19, Lines 25-26, in Claim 9, after "included in the" delete "compressed video content".

Signed and Sealed this
Seventh Day of August, 2018

Andrei Iancu
*Director of the United States Patent and Trademark Office*